J. H. MULLALY.
MATRIX MOLD.
APPLICATION FILED MAY 17, 1913.

1,098,289.

Patented May 26, 1914.
2 SHEETS—SHEET 1.

Witnesses
F. C. Gibson.
Dudley B. Howard.

Inventor
Joseph H. Mullaly.
By Victor J. Evans
Attorney

J. H. MULLALY.
MATRIX MOLD.
APPLICATION FILED MAY 17, 1913.
1,098,289.
Patented May 26, 1914.
2 SHEETS—SHEET 2.
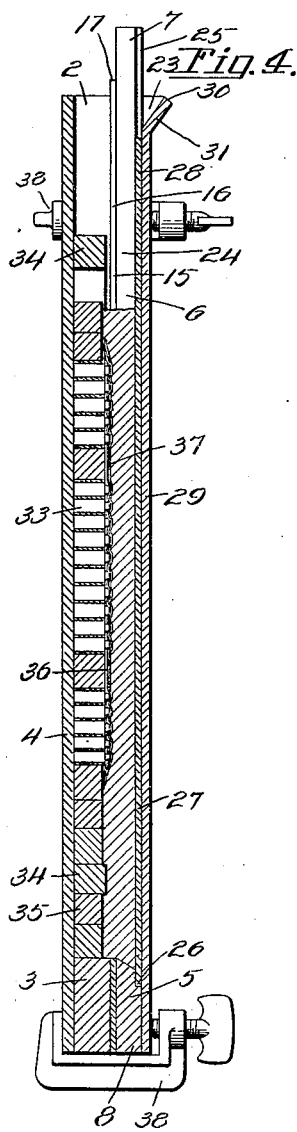
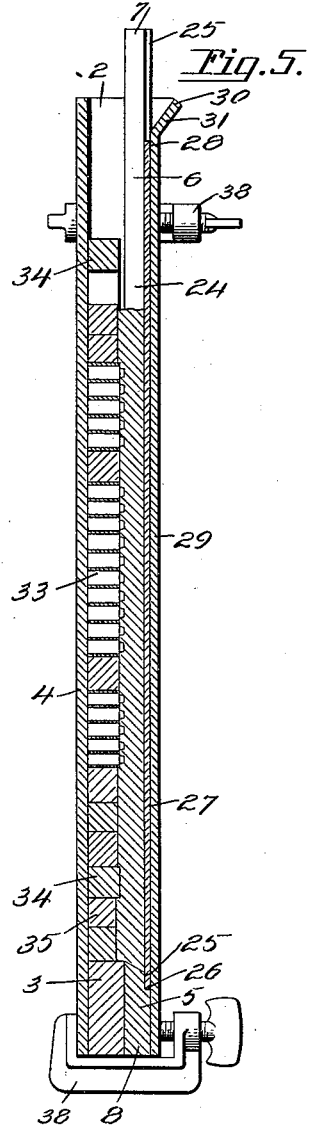
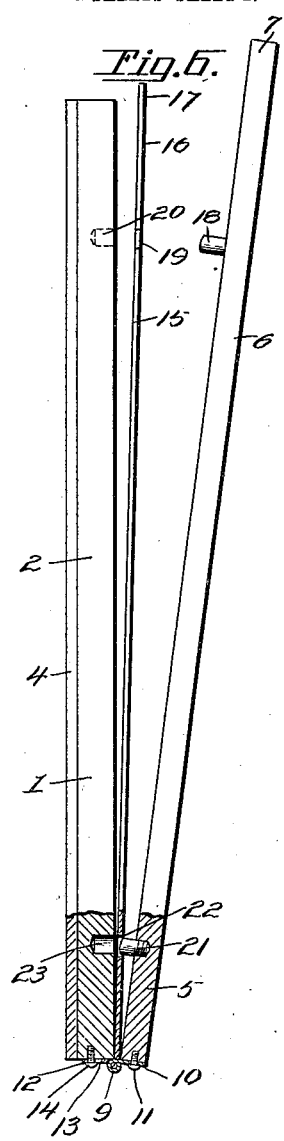
Witnesses
F. C. Gibson.
Dudley B. Howard.
Inventor
Joseph H. Mullaly.
By Victor J. Evans
Attorney

UNITED STATES PATENT OFFICE.

JOSEPH H. MULLALY, OF WINNIPEG, MANITOBA, CANADA.

MATRIX-MOLD.

1,098,289.  Specification of Letters Patent.  Patented May 26, 1914.

Application filed May 17, 1913. Serial No. 768,315.

*To all whom it may concern:*

Be it known that I, JOSEPH HENRY MULLALY, a citizen of the United States, residing at Winnipeg, in the Province of Manitoba and Dominion of Canada, have invented new and useful Improvements in Matrix-Molds, of which the following is a specification.

This invention relates to a mold for molding the matrices to be used in producing electrotype plates, the main object being to provide a mold constructed so that the said matrices may be composed of wax or some soft metal.

A further object is to provide means forming a part of the mold and aiding in the production of matrices whose intaglio impressions are of uniform depth, thus presenting a perfectly true molding surface.

The invention consists of the features of construction, combination and arrangement of parts, hereinafter fully described and claimed, reference being had to the accompanying drawings, in which:—

Figure 1:
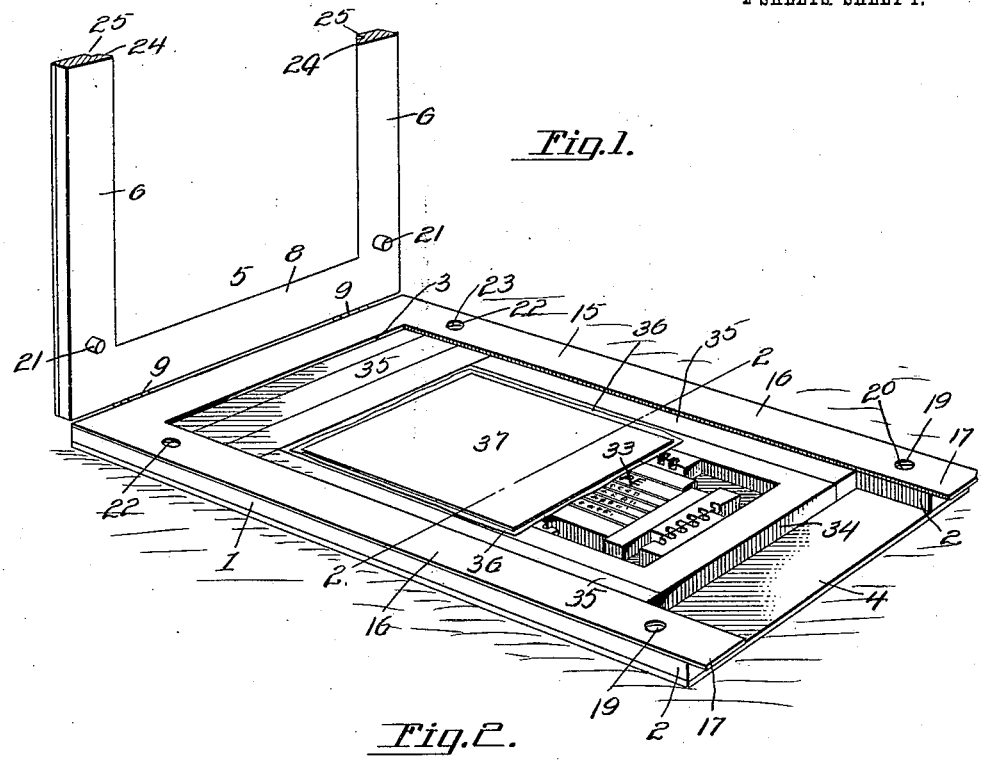
Figure 2:
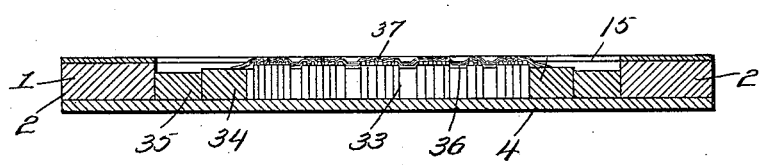
Figure 3:
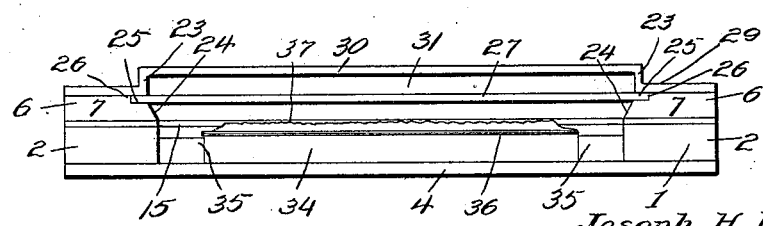

Figure 1 is a fragmentary perspective view of the device, showing the cover in open position; Fig. 2 is a transverse sectional view taken in line 2—2 of Fig. 1; Fig. 3 is a top plan view of the complete mold when in position for making the false impression; Fig. 4 is a longitudinal sectional view taken through the same; Fig. 5 is a similar sectional view, showing the same during the making of the true impression; and, Fig. 6 is a fragmentary side elevation of the mold when inoperative, showing the cover partially open.

In the drawings, a mold is shown for making the matrices for flat electroplates, but it is to be understood that this invention pertains also to the making of curved matrices, it being simply necessary in this case to have the component parts of the mold properly curved.

In a mold constructed in accordance with the preferred embodiment of the invention 1 designates an iron chase which comprises the parallel side portions 2 and the cross portion 3 connecting the former. This chase is adapted to be mounted upon a steel base plate 4 which serves as a support and backing for the type form which is used in the mold. A locking member 5 conforming in shape to the chase 1 and having its side portions 6 constructed longer than the side portions 2 of the chase so that their projecting free ends 7 form handles or means for grasping the same, is adapted to overlie the said chase with its cross portion 8 pivotally connected to the cross portion 3 of the chase by means of hinges 9. Each hinge 9 comprises a leaf 10 secured to the rear edge of the said portion 8 of the member 5 by means of suitable screws 11, and a leaf 12 having longitudinal slots 13 therein for the reception of the screws 14 which bind the same to the rear edge of the cross portion of the chase 1. This construction of hinges allows for slight vertical movement of the locking member 5 for a purpose to be described more fully hereinafter. A spacing member 15 conforming in shape to the chase 1 is adapted to be interposed between the surface of the same and the lower surface of the locking member 5 and has the ends of its parallel side portions 16 projecting slightly past the free ends of the side portions 2 of the chase to provide grip portions 17. This spacing member is adapted to be secured in position by means of the depending lugs 18 formed on the under surface of the side portions 6 of the locking member adjacent their free ends, which are adapted to be received within alining openings 19 in the corresponding portions of the member 15 and recesses 20 provided in the chase, and also by lugs 21 which depend from the cross portion 8 of the locking member and are adapted to be received by the openings 22 in the cross portion of the spacing member, and the alining recesses 23 in the chase, so as to prevent movement of the spacing member when in position. The spacing member 15 is cut from a plate of thin steel and is of exactly the same thickness throughout.

The inner edges of the side cross portions of the locking member 5 are beveled, as at 24, and provided with the grooves 25 adjacent the upper surface of the said locking member, which latter provide the horizontal shoulders 26 which are adapted to support a backing plate 27. This backing plate 27 is preferably formed of tin or lead and is adapted to mold the back of the matrix. This plate 27 when in position has its front edge 28 spaced inwardly from the front edges of the side portions of the chase 1. A rectangular cover plate 29 is adapted to rest upon the upper surface of the locking member 5 and the backing plate 27. The cover 29 is provided at its front edge with an outwardly flaring lip 30 comprising an inclined top wall 31, which extends outwardly from the front edge 28 of the backing plate 27, and the vertical side walls 32.

In using the mold to form the matrix for an electroplate, the type form 33 which is locked within a suitable printer's chase 34 is positioned within the chase 1 and rests upon the true upper surface of the steel base plate 4. This chase 34 is centered and locked within the chase 1 by means of suitable quoins 35, as shown in Fig. 1. Then, fine cloth, paper, or other pliable material 36 is placed upon the face of the type, and a layer of tin or lead foil 37 is placed on top of the cloth. The mold is then run through a molding machine, or the pliable material and foil covering for the type is generally beaten in with a molding brush, so as to form the same to the shape of the type faces. The spacing plate or member 15 is next placed in position and the locking member 5 is swung downwardly into locking position. The backing plate 27 and the cover 29 are finally placed in position and clamped therein by means of suitable clamps 38 which engage the side portions of the steel base plate 4 and the said cover plate 29. The mold is then tilted so that wax composition may be poured through the lip 30 into the space provided between the type form and the backing plate, a "false" impression being thus made. The next step in the process is to make the true impression, and in order to accomplish this, the locking member 5, with the backing plate and cover still retained in position thereagainst so as to secure the unfinished matrix in position, is swung back upon its hinges, and the spacing member 15 is removed. The flexible material and the tin or lead foil are both removed from the face of the type form. Then the removable portion of the mold constituted by the locking member, the backing plate and the cover, is returned to closed position, the loosely connected leaves 12 of the hinges being adapted to move upon the edge of the chase 1 so as to permit the locking member to fit closely against the upper surface of the chase, so as to make an even impression. In this true impression, the type faces increase the impression made in the first step by a depth equal to the thickness of the spacing member.

In the use of this process, the matrix formed is perfectly true and of uniform thickness throughout so that no shaving of the backs thereof is necessary before the preparation of the same for the production of the faces of the plate or cut in cameo. This latter operation is a process distinct from the use of my improved mold, and, therefore, need not be described.

What is claimed is:

1. A device of the class described comprising means for holding a printing body having an impression-forming face, a member movably associated with said means and adapted to receive the melted impression-receiving material to hold the same in contact with the said face, and a pliable sheet of malleable metal engageable with the said face and adapted to conform to the shape thereof so as to prevent direct contact of the said face with the impression-receiving material and to make an initial impression therein, said sheet being adapted to be removed prior to the making of a final impression direct from the said face, and a removable spacing member adapted to be interposed between the holding means and said member to slightly space the same during the making of the initial impression.

2. A device of the class described comprising a body having a recess adapted to receive the melted impression-receiving material, a holding member for the printing body adapted to be positioned against the said body to complete the mold and to expose the impression-forming face of the printing body within the mold, a pliable sheet adapted to be positioned within the mold in contact with the said impression-forming face for spacing the impression-receiving material therefrom during the initial molding operation, and a spacing member of uniform thickness throughout adapted to be interposed between the first-named body and the holding member during the initial operation, said spacing member being adapted to be withdrawn during the final impression operation.

3. In a device of the class described, a substantially U-shaped chase including parallel side portions and a connecting end portion, a backing plate for the chase, the chase being adapted to receive an impression forming body, a substantially U-shaped locking member adapted to be positioned upon the opposite side of the chase with respect to the backing plate, a cover plate positioned against the outer face of the locking member to complete the mold for the reception of the melted impression-receiving material in the initial operation, and a U-shaped spacing member of uniform thickness throughout adapted to be positioned between the chase and the locking member during the said initial operation and adapted to be withdrawn therefrom before the final impression-operation.

4. In a device of the class described, a substantially U-shaped chase including parallel side portions and a connecting end portion, a backing plate for the chase, the chase being adapted to receive an impression forming body, a substantially U-shaped locking member adapted to be positioned upon the opposite side of the chase with respect to the backing plate, a cover plate positioned against the outer face of the locking member to complete the mold for the reception of the melted impression-receiving material in the initial operation, a U-shaped spacing member of uniform thickness throughout adapted to be positioned between the chase and the locking member during the said initial operation and adapted to be withdrawn therefrom before the final impression-operation, the chase and spacing member being provided with alining openings in the side portions thereof, and securing pins provided upon the inner face of the locking member for engagement within the said openings.

5. In a device of the class described, a substantially U-shaped chase including parallel side portions and a connecting end portion, a backing plate for the chase, the chase being adapted to receive an impression-forming body, a substantially U-shaped locking member adapted to be positioned upon the opposite side of the chase with respect to the backing plate, a cover plate positioned against the outer face of the locking member to complete the mold for the reception of the melted impression-receiving material in the initial operation, a U-shaped spacing member of uniform thickness throughout adapted to be positioned between the chase and the locking member during the said initial operation, hinges connecting the cross portion of the locking member pivotally to the cross portion of the chase, each hinge comprising pivoted leaves, one leaf being fixedly connected to the outer edge of the locking member, the opposite leaf being provided with a slot, and an attaching member engaged with the chase and being loosely mounted within the said leaf slot.

6. In a device of the class described, a substantially U-shaped chase including parallel side portions and a connecting end portion, a backing plate for the chase, the chase being adapted to receive an impression-forming body, a substantially U-shaped locking member adapted to be positioned upon the opposite side of the chase with respect to the backing plate, a cover plate positioned against the outer face of the locking member to complete the mold for the reception of the melted impression-receiving material in the initial operation, a U-shaped spacing member of uniform thickness throughout adapted to be positioned between the chase and the locking member during the said initial operation and adapted to be withdrawn therefrom before the final impression-operation, hinges connecting the cross portion of the locking member pivotally to the cross portion of the chase, each hinge comprising pivoted leaves, one leaf being fixedly connected to the outer edge of the locking member, the opposite leaf being provided with a slot, and an attaching screw engaged within the chase and being loosely fitted within the said leaf slot with its head engageable with the outer face thereof.

In testimony whereof I affix my signature in presence of two witnesses.

JOSEPH H. MULLALY.

Witnesses:
  M. L. DRUMMOND,
  ALFRED J. ANDREWS.

---

Copies of this patent may be obtained for five cents each, by addressing the "Commissioner of Patents, Washington, D. C."